(12) United States Patent
Nothofer et al.

(10) Patent No.: US 7,570,852 B2
(45) Date of Patent: Aug. 4, 2009

(54) OPTICAL FIBER CABLE SUITED FOR BLOWN INSTALLATION OR PUSHING INSTALLATION IN MICRODUCTS OF SMALL DIAMETER

(75) Inventors: Klaus Nothofer, Erkrath (DE); Alexander Weiss, Monchengladbach (DE); Peter Lausch, Krefeld (DE)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/672,714

(22) Filed: Feb. 8, 2007

(65) Prior Publication Data

US 2007/0183726 A1    Aug. 9, 2007

(30) Foreign Application Priority Data

Feb. 8, 2006   (NL) .................................. 1031110
Jun. 13, 2006  (WO) ............... PCT/NL2006/000289

(51) Int. Cl.
*G02B 6/44*    (2006.01)
(52) U.S. Cl. .................................... 385/100
(58) Field of Classification Search .......... 385/100–114
See application file for complete search history.

(56) References Cited

U.S. PATENT DOCUMENTS

| 6,137,935 | A  | 10/2000 | Bohme et al. |
|---|---|---|---|
| 6,334,015 | B2 | 12/2001 | Jamet |
| 6,801,696 | B2 | 10/2004 | Davis et al. |
| 6,912,347 | B2 | 6/2005  | Rossi et al. |
| 2002/0061231 | A1 | 5/2002 | Finzel et al. |
| 2004/0208463 | A1 | 10/2004 | Park |
| 2007/0183726 | A1 | 8/2007 | Nothofer et al. |

FOREIGN PATENT DOCUMENTS

| EP | 1369724 A2 | 12/2003 |
|---|---|---|
| EP | 1420279 A2 | 5/2004 |
| EP | 1469329 A2 | 10/2004 |
| GB | 2215480 A | 5/2007 |
| WO | 2005019894 A1 | 3/2005 |
| WO | 2007091879 A1 | 8/2007 |

OTHER PUBLICATIONS

European Search Report and Written Opinion for corresponding European Application No. 07002406, dated May 2, 2007.
International Search Report and Written Opinion dated Sep. 7, 2006 in International application No. PCT/NL2006/000289.
International Report on Patentability in corresponding International Application No. PCT/NL2006/000289, issued on Aug. 12, 2008.

*Primary Examiner*—Sarah Song
(74) *Attorney, Agent, or Firm*—Summa, Additon & Ashe, P.A.

(57) ABSTRACT

The invention relates to optical fiber cables and, more specifically, to an optical fiber cable especially suited for blown installation or pushing installation in microducts of small diameter. An exemplary microcable for installation in small microducts has an outer sheath as buffer tube that holds a plurality of optical fibers without a layer of strength elements stranded around the outer sheath, which is made of one single thermoplastic material.

27 Claims, 1 Drawing Sheet

OPTICAL FIBER CABLE SUITED FOR BLOWN INSTALLATION OR PUSHING INSTALLATION IN MICRODUCTS OF SMALL DIAMETER

CROSS-REFERENCE TO PRIORITY APPLICATIONS

This application hereby claims the benefit of pending Dutch Application No. 1,031,110 (filed Feb. 8, 2006 at the Dutch Patent Office) and pending International Application No. PCT/NL2006/000289 (filed Jun. 13, 2006 at the Dutch Patent Office). International Application No. PCT/NL2006/000289 designates the United States and, accordingly, this application is a continuation-in-part thereof.

Dutch Application No. 1,031,110 and International Application No. PCT/NL2006/000289 (i.e., the priority applications) were each filed in the name of Draka Comteq B.V., and each is hereby incorporated by reference in its entirety.

FIELD OF THE INVENTION

The invention relates to optical fiber cables and, more specifically, to an optical fiber cable especially suited for blown installation or pushing installation in microducts of small diameter.

BACKGROUND OF THE INVENTION

Fiber optic cables have been commonly deployed by installing them in ducts by blowing or pulling, burying them in the ground, or suspending them between above-ground poles. Traditional duct installation, however, uses space inefficiently. Typically, one cable per inner duct has been the maximum capacity although in some cases two cables have been pulled-in or jetted-in.

Recently developed optical microcabling technology has been introduced for the deployment of fiber optic cables to increase use of the conduit space and to enhance profitability of the current (and/or future) telecommunications infrastructure. This technology involves the use of standard inner ducts in which microducts are jetted, followed by the jetting of microduct cables or microcables into the microducts when required. Although originally intended for business access networks (FTTB) and fiber-to-the-home (FTTH), this technology has been used successfully in long-haul applications as well.

Microducts are empty tubes of small outer/inner diameter (e.g., generally in the range of 5/3.5 millimeters to 12/10 millimeters) that can be blown or pushed into empty or partially filled standard ducts. Microduct cables or microcables, specifically designed for this kind of application, are then installed as needed inside the microduct tubes by blown installation techniques.

There are various microduct cables on the market that are suited for different microduct inner diameter dimensions and holding a plurality of optical fibers inside.

U.S. Publication No. 2002/0061231 A1, for example, discloses a microcable including a metal or plastic tube of small diameter (preferably 3.5 to 5.5 mm) coated with a plastic layer (e.g., PTFE). The optical waveguides are then introduced into the tube either after the empty tube has been laid or at the factory.

U.S. Publication No. 2004/208463 A1 (and its European counterpart Publication No. EP 1,469,329) relate to a cable for use in air blowing installation. The cable includes at least one transmission medium of electrical or optical signals and a hollow cylindrical tube containing the transmission medium therein, the tube being formed at a surface thereof with a plurality of crater-shaped recesses.

Published U.K. Application No. GB 2,215,480 A relates to a cable element having a plurality of primary coated optical fibers laid in a juxtaposed configuration of a central fiber surrounded by the remaining fibers, the assembly being encapsulated in a plastic sheath.

U.S. Pat. No. 6,912,347 (and its European counterpart Publication No. EP 1,420,279) relate to a fiber optic cable with optical fibers stranded around a central strength member and surrounded by a thin outer jacket made of a low coefficient-of-friction material. The outer jacket is constructed to show the shape of the stranded optical fibers, thereby forming a textured outer surface.

U.S. Pat. No. 6,801,696 (and its European counterpart Publication No. EP 1,369,724) relate to an optical fiber cable structure including a tube having inorganic fillers dispersed within a soft resin. The tube houses optical fibers or ribbons surrounded by a water blocking material. The use of the inorganic fillers in the soft resin purportedly reduces the thermal expansion/contraction of the cable structure and increases the compression resistance of the cable structure to axial loads, providing protection to the optical fibers.

International Publication No. WO 2005/019894 relates to a cable that is suitable for push/pull installation in a microtube. The cable includes an outer sheath that surrounds at least one optical fiber. The outer sheath is made from a material blend of multiple thermoplastics having a modulus of elasticity of between about 1,000 and 2,500 MPa under normal use conditions, a thermal expansion coefficient of less than $1 \times 10^{4}/°$ C., and a post-shrinkage coefficient of less than 0.1 percent.

U.S. Pat. No. 6,137,935 relates to an optical cable including at least one optical fiber surrounded by a tubular sheath, wherein a plastic inner layer and a plastic outer layer of the tubular sheath are extruded together around the optical fiber in a single operating step. Tension elements, which extend in the longitudinal direction of the optical cable, are embedded in the tubular sheath in the region between the inner layer and the outer layer.

U.S. Pat. No. 6,334,015 relates to a telecommunication cable having optical fibers contained in a retaining sheath, wherein the retaining sheath tightly grips a predetermined number (N) of optical fibers in a group (e.g., four, six, eight or twelve fibers), thereby constituting a compact module. A plurality of such optical fiber modules (i) can be combined within a protective jacket of a telecommunication cable or (ii) can be retained in a cylindrical sheath to form a bundle of several modules, with or without a central reinforcing member, which bundle is combined with other bundles of modules in a protective jacket of a telecommunication cable. Such a cable, however, is not regarded as a microcable.

SUMMARY OF THE INVENTION

The object of the present invention is to develop and provide a microcable suitable for push/blown installation in small microducts.

Another object of the present invention is to develop a jacket material for a microcable that provides low friction and sufficient stiffness, as well as limited post-extrusion shrinkage. The cable facilitates high fiber count and blowing performance, and is mechanically robust enough to be safely installed in an outside plant environment.

These objects are achieved according to the present invention by a microcable for installation in small microducts. The microcable includes an outer sheath (e.g., a buffer tube) that holds a plurality of optical fibers. Moreover, the microcable is made of one single polymeric material and is not reinforced (i.e., within the core, within the sheath, or outside the sheath) by strength elements (e.g., axial or stranded support members).

Advantageous configurations of the invention emerge from the following description, drawings, and claims.

DETAILED DESCRIPTION

An exemplary embodiment of the present invention is explained with reference to FIGS. 1 and 2.

Figure 1:
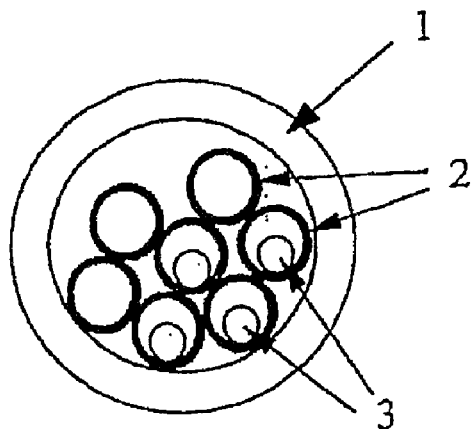
FIG. 1 shows a cross-sectional view of an exemplary optical microcabling deployment.

FIG. 1 shows an example of microcabling technology for the deployment of optical fiber cables. This configuration depicts a duct 1 in which seven microducts 2 have been placed. As depicted, four of the seven microducts 2 have a microcable 3 inside.

Figure 2:
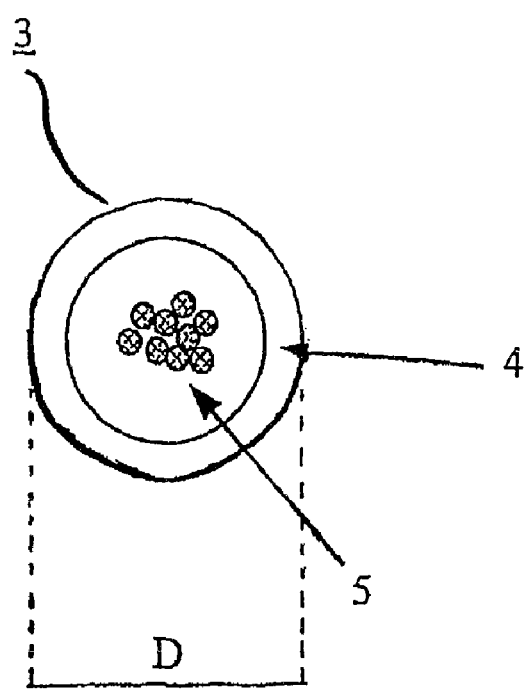
FIG. 2 shows a cross-sectional view of a microcable according to the present invention.

FIG. 2 shows a microcable 3 according to the present invention. It includes a single buffer tube 4 holding a plurality of optical fibers 5. The fibers do not have a fixed position within buffer tube 4, nor to each other. The buffer tube 4 functions as an outer sheath, which is typically smooth and free of recesses. A water-repelling gel (e.g., a thixotropic material) typically surrounds the optical fibers 5 within the buffer tube 4.

The buffer tube 4 of the microcable 3 is typically a homogeneous structure made of single polymeric material, more typically a thermoplastic material such as polyamide (i.e., nylon), polycarbonate (PC), or polyester (e.g., polybutylene terephthalate—PBT), rather than a mixture of polymeric materials.

Moreover, and as noted, the buffer tube 4 is not supported by supplemental strength elements (i.e., not reinforced), such as by a central strength member within the buffer tube 4 or otherwise by a sheath strengthening member that is internal or external to the buffer tube 4. In other words, the structural strength of the buffer tube 4 is provided by the inherent properties of the constituent polymeric material such that no supplemental strength elements are required to support the microcable 3 (i.e., in addition to the buffer tube, the optical fibers, and the optional thixotropic gel).

The microcable 3 of the present invention facilitates outstanding fiber density. By way of example, the outer diameter ($D_O$) of a microcable 3 having 24 optical fibers inside can be about 3.0 mm, whereas a cable of the same outer diameter ($D_O$) having a separate tube and sheath can take only 12 fibers. Alternatively, a cable with 24 fibers but with separate sheaths and strength elements has a diameter of about 3.8 mm. This means that, as compared with less efficient configurations having the same outer diameter, the microcable according to the present invention can hold about 70 percent to 100 percent more fibers.

The optical fibers 5 used are typically standard single mode or multimode optical fibers with a nominal diameter between about 200 and 250 ($\mu m$). Relative to each other, the optical fibers 5 have a length difference of less than about 0.03 percent. The optical fibers 5 generally extend in a longitudinal direction but have no fixed position relative to the inner surface of the buffer tubes 4.

A microcable 3 designed according to the present invention achieves certain advantages, such as providing a cable with an extremely small outer diameter ($D_O$) that is especially suited for installation in small microducts 2 and that is flexible enough to be easily blown in microducts. Furthermore, it allows operation at low temperatures and provides excellent protection of the fibers against water, microbending, and mechanical damage.

The microcable 3 according to the present invention complies with all major outdoor cable requirements (e.g., not sensitive to mechanical damage, high tensile strength, crush resistance, and able to work at an operational temperature between about −30° C. and +60° C.). Another advantage of the present microcable is that it is easily handled by installation personnel of ordinary skill.

The jacket material (i.e., the outer sheath) is typically made from a single thermoplastic material having a Young's modulus between about 1,300 N/mm$^2$ and 3,000 N/mm$^2$. The post-extrusion shrinkage is typically between 0.1 percent and 1 percent. The post-extrusion shrinkage is measured on a cable sample after 50 cycles (−20° C./70° C.). The thermal elongation coefficient is usually between about $1 \times 10^{-4}$/K and $2 \times 10^{-4}$/K. The viscosity number is typically greater than about 160, more typically greater than about 190, as measured according to ISO 307. The moisture uptake is typically a maximum of 1.8 percent at a saturated temperature of 23° C. as measured according to ISO 62. An exemplary thermoplastic material is polyamide 12 grade.

The microcable according to the present invention might possess an exemplary outer diameter of between about 1.5 and 3.2 millimeters (e.g., 2-3 millimeters). At this outer diameter range, the microcable might contain, for instance, up to 24 or more optical fibers (e.g., 10 or more optical fibers).

More specifically, the fiber density of the cable (i.e., the cross-sectional area of optical fibers within the cable divided by the cross-sectional area of the cable itself) is typically between about 0.1 and 0.2. Whereas significantly lower fiber density is inefficient, significantly higher fiber density can limit the operational temperature range. Those having ordinary skill in the art can readily determine fiber densities for various microcabling configurations.

By way of illustration, a microcable having a nominal outer diameter about 1.5 millimeters achieves a fiber density of about 0.1 by enclosing 3-4 optical fibers having a nominal diameter of 250 microns or about 5-6 optical fibers having a nominal diameter of 200 microns, and achieves a fiber density of about 0.2 by enclosing 7-8 optical fibers having a nominal diameter of 250 microns or about 11-12 optical fibers having a nominal diameter of 200 microns.

And by way of further illustration and comparison, a microcable having a nominal outer diameter about 3.2 millimeters achieves a fiber density of about 0.1 by enclosing about 16 optical fibers having a nominal diameter of 250 microns or about 25 optical fibers having a nominal diameter of 200 microns, and achieves a fiber density of about 0.2 by enclosing about 30 optical fibers having a nominal diameter of 250 microns or about 50 optical fibers having a nominal diameter of 200 microns.

The cable thickness, as defined by the ratio of the sheath's respective outer and inner diameters, is in the range of about 1.5-2.0 (e.g., about 1.75).

The microcable according to the present invention provides low post-shrinkage and, at the same time, is easy to handle and cost-effective to produce.

By selecting the specific kind of jacket material (e.g., one thermoplastic material), a mixture of polymeric materials is avoided. Employing a lone, suitable thermoplastic material not only provides excellent strength and flexibility but also precludes undesirable delamination of the buffer tube 4.

Although the buffer tube 4 is made of a single polymeric material, the polymeric material itself may contain additives, such as UV stabilizers, aging stabilizers, color components, and pigments (e.g., thermoplastic polyamide 12 enhanced with stabilizers and/or colorants). The polymeric material typically does not contain any inorganic fillers.

The present microcable advantageously provides a simple cable design by employing an outer sheath (i.e., a buffer tube) made of only one polymeric material, such as an enhanced thermoplastic polymer. In addition, the microcable according to the present invention is typically manufactured by extrusion, wherein no specific measures are taken to modify the outer surface of the sheath (i.e., a step of roughening or smoothing). Even so, the resulting microcable is suitable for a broad range of uses (i.e., pushing installation, blowing installation, as well as indoor and outdoor applications).

In the specification and the figures, typical embodiments of the invention have been disclosed. Specific terms have been used only in a generic and descriptive sense, and not for purposes of limitation. The scope of the invention is set forth in the following claims.

The invention claimed is:

1. A non-reinforced microcable suitable for microduct installation, comprising:
   one or more optical fibers; and
   a buffer tube enclosing said one or more optical fibers; and
   wherein said buffer tube is made of one single thermoplastic material possessing a Young's modulus between about 1,300 and 3,000 N/mm$^2$, a post-extrusion shrinkage between about 0.1 and 1 percent, and a thermal elongation coefficient between about $1 \times 10^{-4}$/K and $2 \times 10^{-4}$/K; and
   wherein no supplemental strength element is positioned within or about said buffer tube.

2. The microcable according to claim 1, further comprising water-repelling gel within said buffer tube, said water-repelling gel substantially surrounding said one or more optical fibers.

3. The microcable according to claim 1, wherein the fiber density of the microcable is between about 0.1 and 0.2.

4. The microcable according to claim 3, wherein the microcable's outer diameter is between about 1.5 and 3.2 millimeters.

5. The microcable according to claim 1, wherein the ratio of said buffer tube's outer diameter to said buffer tube's inner diameter is between about 1.5 and 2.0.

6. The microcable according to claim 1, wherein the outer surface of said buffer tube is substantially smooth and free of recesses.

7. The microcable according to claim 1, wherein said buffer tube has a moisture uptake of less than about 1.8 percent according to ISO 62 (as measured at a saturated temperature of 23° C.).

8. The microcable according to claim 1, wherein said one single thermoplastic material consists essentially of polyamide 12.

9. The microcable according to claim 8, wherein said polyamide 12 is enhanced with stabilizer and/or colorant.

10. The microcable according to claim 1, wherein said one single thermoplastic material has a viscosity number of more than about 160.

11. A microcabling configuration comprising a microduct and one of more microcables according to claim 1 positioned therein.

12. A method for installing the microcable according to claim 1, comprising the step of pushing and/or air blowing the microcable in a microduct.

13. A non-reinforced microcable, consisting essentially of:
   a buffer tube homogeneously extruded from polyamide 12 that possesses a Young's modulus between about 1,300 and 3,000 N/mm$^2$, a post-extrusion shrinkage between about 0.1 and 1 percent, and a thermal elongation coefficient between about $1 \times 10^{-4}$/K and $2 \times 10^{-4}$/K, and that is optionally enhanced with stabilizer and/or colorant, said buffer tube having a substantially smooth, recess-free outer surface;
   a plurality of optical fibers positioned within said buffer tube; and
   water-repelling gel surrounding said plurality of optical fibers within said buffer tube.

14. The microcable according to claim 13, wherein the fiber density of the microcable is between about 0.1 and 0.2.

15. The microcable according to claim 14, wherein:
   said plurality of optical fibers comprises more than about 10 optical fibers; and
   the microcable's outer diameter is between about 1.5 and 3.2 millimeters.

16. A microcabling arrangement comprising the microcable according to claim 13 and a microduct, wherein the microcable is positioned within the microduct.

17. A method for installing the microcable according to claim 13, comprising the step of pushing and/or air blowing the microcable in a microduct.

18. A microcabling deployment, comprising:
   a microduct; and
   a central loose tube microcable positioned within said microduct, said microcable comprising (i) an extruded buffer tube homogeneously formed from a single polymeric material possessing a Young's modulus between about 1,300 and 3,000 N/mm$^2$, a post-extrusion shrinkage between about 0.1 and 1 percent, and a thermal elongation coefficient between about $1 \times 10^{-4}$/K and $2 \times 10^{-4}$/K, and (ii) a plurality of optical fibers non-fixedly positioned within said buffer tube;
   wherein said microcable possesses an outer diameter of less than about 3.2 millimeters and a fiber density of between about 0.1 and 0.2; and
   wherein no supplemental strength element is positioned within or about said microcable.

19. A microcabling deployment according to claim 18, wherein said central loose tube microcable further comprises water-repelling gel, wherein said water-repelling gel substantially surrounds said plurality of optical fibers within said buffer tube.

20. A microcabling deployment according to claim 18, wherein:
   said plurality of optical fibers comprises more than about 10 optical fibers; and
   the microcable's outer diameter is between about 2 and 3 millimeters.

21. A microcabling deployment according to claim 18, wherein the ratio of said buffer tube's outer diameter to said buffer tube's inner diameter is between about 1.5 and 2.0.

22. A microcabling deployment according to claim 18, wherein the outer surface of said buffer tube is substantially smooth and recess-free.

23. A microcabling deployment according to claim 18, wherein said buffer tube has a moisture uptake of less than about 1.8 percent according to ISO 62 (as measured at a saturated temperature of 23° C.).

24. A microcabling deployment according to claim 18, wherein said buffer tube is homogeneously formed from a polymeric material consisting essentially of polyamide 12.

25. A microcabling deployment according to claim 18, wherein said buffer tube is homogeneously formed from a polymeric material having a viscosity number of more than about 160.

26. A microcabling deployment according to claim 18, wherein said buffer tube is homogeneously formed from a polymeric material having a viscosity number of more than about 190.

27. A microcabling deployment according to claim 18, wherein exactly one central loose tube microcable is positioned within said microduct.

* * * * *